United States Patent Office 3,173,710
Patented Mar. 16, 1965

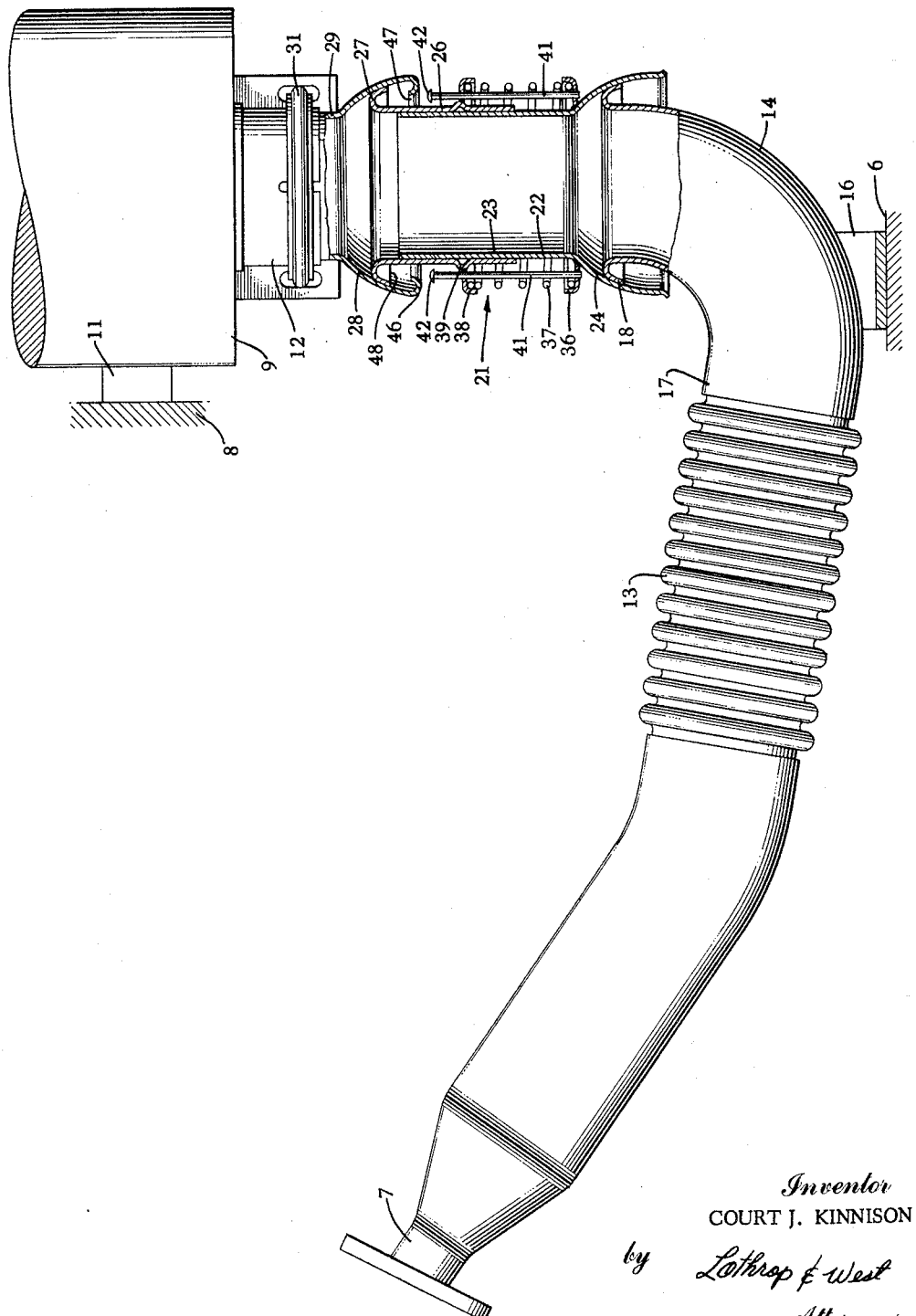

3,173,710
EXHAUST SYSTEM FOR VEHICLES
Court J. Kinnison, Oakland, Calif., assignor to Western Piping & Engineering Co., Inc., a corporation
Filed May 2, 1962, Ser. No. 191,937
1 Claim. (Cl. 285—9)

My invention relates to exhaust systems especially adapted for use on vehicles such as trucks having an engine mounted on the truck frame in a relatively stationary position and also having a movable or tiltable cab on which the engine exhaust muffler is mounted.

In the modern design of heavy duty motor vehicles, such as trucks, it has become increasingly the custom to carry the engine muffler in a generally vertical direction on the truck cab and to mount the truck cab on the vehicle frame over the engine. The cab is arranged to be tilted for access to the engine, so some sort of disconnection must be provided in the exhaust system connecting the engine exhaust manifold with the muffler. Also the usual, relative minor movement of the cab with respect to the frame as the vehicle is going over the road and the movement of the engine on the frame introduce a number of random relative motions between the muffler and the engine when the cab is in its normal position.

It is therefore an object of my invention to provide an exhaust system for vehicles to afford a good interconnection between the engine exhaust manifold and the muffler despite the fact that these elements are mounted on relatively movable parts.

Another object of the invention is to provide an exhaust system having when connected a relatively tight and leakproof arrangement so that little or no exhaust gas or accompanying fluids escape from the system prior to final discharge.

Another object of the invention is to provide an exhaust system which readily disconnects whenever the cab is tilted respecting the vehicle frame and which readily connects in proper orientation whenever the cab is restored to its operating position with respect to the vehicle frame.

Another object of the invention is to provide an appropriate exhaust system in which minor jiggling and motion of the cab with respect to the frame and of the engine with respect to the frame are well accommodated by the system without leakage and without impairing the ready disconnect and connect features of the system.

A further object of the invention is to provide an exhaust system effective to work at widely different temperatures of operation, always maintaining an appropriate interconnection between the parts despite sundry expansions and contractions.

A still further object of the invention is in general to provide an improved exhaust system for vehicles.

While the exhaust system pursuant to the invention can be incorporated in many different ways, dependent upon the particular vehicle arrangement in which it is to be utilized, it has successfully been embodied in commercial vehicles substantially as shown in the accompanying drawing, in which the figure is a side elevation, with parts in section, of an exhaust system pursuant to the invention.

In accordance with usual practice, there is provided a vehicle frame 6 of the customary sort not illustrated in detail. The frame 6 normally carries an internal combustion engine having a manifold, not shown, exhausting into an exhaust pipe 7 of an appropriate configuration. Also mounted on the frame 6 is a diagrammatically indicated operator's cab 8 normally in the relationship shown with respect to the frame 6, but which can be tilted or moved upwardly or away from the frame 6. This movement usually is arcuate and so has a substantial vertically upward component. It can therefore be said that the cab 8 moves toward and away from the frame 6 in a generally up and down direction.

Mounted on the cab 8 is an exhaust muffler 9 by any convenient sort, preferably secured to the cab 8 by means of a bracket 11. The muffler has an inlet tube 12 at its lower end so that the axis of the muffler in normal position is generally vertical.

The exhaust pipe 7 from the engine is connected through a flexible pipe section 13 to an elbow 14. A bracket 16 mounts the elbow 14 fixedly on the frame 6, one leg 17 of the elbow being directed toward the exhaust pipe 7 and being connected to the pipe section 13 and the other leg of the elbow being directed generally upward toward the inlet tube 12 of the muffler 9.

The flexible pipe section 13 is interposed between the elbow 14 and the exhaust pipe 7 to take care of movements of the engine relative to the frame 6 and also in order that the pipe 7 may be moved to various locations in the event differently constructed engines are utilized from time to time in the frame 6.

The elbow 14 is conveniently fabricated of sheet metal of uniform thickness throughout and at its upper, open end is preferably provided with an outwardly and downwardly turned rounded flange end 18 affording a limited annular portion having an approximately spherical exterior surface.

Designed to abut the rounded end 18 is an expansion unit 21. This unit is comprised of a number of sheet metal parts and includes a lower tube 22 having a circular-cylindrical portion 23 enlarging into a lower spherical portion 24. The radius of the spherical portion 24 is approximately the same as that of the spherical portion on the flange end 18 so that the members 18 and 24 rock or tilt relative to each other while providing a relatively tight interconnection during variations in attitude between the expansion unit and the elbow 14.

Also included in the expansion unit 21 is an upper, outer tube 26 conveniently fabricated of the same uniform sheet metal and slidably engaged with the tube 22. At its upper end the tube 26 is formed with a rounded terminus 27 defined by a down-turned flange having an exterior spherical surface.

Designed to abut the spherical surface of the terminus 27 of the tube 26 is an enlarged, sheet metal, spherical bell 28 having a tubular portion 29 detachably affixed to the muffler tube 12 by a standard clamp 31. With this mechanism there is provided a continuous gas path from the pipe 7 through the flexible section 13 and the elbow 14 and through the expansion unit 21 and the tube 12 to the muffler 9.

In order to urge together the mating surfaces on the rounded end 18 and on the spherical portion 24 and the mating surfaces on the rounded terminus 27 with the spherical bell 28 so that various differences in position of the parts can be accommodated under all circumstances and despite thermal expansions and contractions, I provide means for urging the expansion unit apart.

Surrounding the lower tube 22 and resting on and welded to the spherical portion 24 is a lower spring cup 36. This carries the lower end of a coiled expansion spring 37 encompassing the tubes 22 and 26. A similar upper cup 38 surrounds the upper tube 26 and is welded to an outward bead 39 formed from the material of the tube 26. The upper cup 38 carries the other end of the expansion spring 37. Anchored in the lower cup 36 by welds at their lower ends are rods 41. These pins pass freely through openings in the upper cup 38. Projecting portions of the rods terminate in stop heads 42.

There is thus provided a telescopic connection between the tubes 22 and 26 with the spring 37 acting to urge the tubes relatively apart but with the spreading movement limited by contact between the upper cup 38 and the heads 42 of the rods 41. The cups 36 and 38 are both flanged to confine and locate the spring 37 so that the spring is spaced from the tubes 22 and 26 a sufficient amount to provide adequate air cooling and to prevent the spring temperature becoming too great. Furthermore, the rods 41 serve as guides and spacers for the intermediate coils of the spring so that they do not buckle into contact with the sometimes hot tubes 22 or 26.

Especially pursuant to the invention, the spherical bell 28 not only is shaped to press into abutment with the rounded terminus 27 of the upper tube 26, but also the bell has an inturned lower flange 46. This is curled over at assembly to provide an inner margin 47, the diameter of which is less than the diameter of the down-turned edge 48 of the curved terminus 27. Normally there is a substantial axial distance or space between the margin 47 and the edge 48.

In the operation of this device, the parts are usually in the position shown in the drawing with the spring 37 urging all of the spherical surfaces into abutment. Various lateral and axial relative movements are permitted. The telescoped tubes 22 and 26 extend and retract as the forces upon them due to movement and due to temperature changes require such alterations. Movable but gastight joints are maintained.

When the cab 8 is lifted or tilted relative to the frame 6, the bell 28 rises with the muffler 9 and for a predetermined distance it is followed by the upper tube 26 because of the force of the expansion spring 37. When the upper cup 38 abuts the heads 42 of the rods 41, the upward movement of the tube 26 is arrested. The expansion unit has been axially extended the maximum amount. Further lifting movement of the cab and of the muffler 9 causes the bell 28 to break abutment with the rounded terminus 27 and to take up the lost motion until the margin 47 establishes a hook-like engagement beneath and behind the larger down-turned edge 48. Still further lifting movement of the cab 8 and of the muffler 9 then causes a bodily lifting of the expansion unit. The lower spherical portion 24 is lifted off of and leaves behind the rounded end 18 of the elbow 14. A complete disconnection is made. The cab can be lifted or tilted any further amount.

When the cab is moved back toward its normal position and is in effect lowered with respect to the frame 6, a reverse sequence takes place. The expansion unit hangs by gravity from its suspension on the inturned flange 46 and remains fully extended by force of the spring 37 until the spherical portion 24 engages with the rounded end 18. Even through the parts may not initially be in exact alignment, the funnel-like flaring contour of the spherical member 24 serves as a guide. The freely depending expansion unit is automatically aligned, with the upper end of the elbow 14 serving as a pilot. Further lowering of the cab 8 and the muffler 9 causes the inturned lower flange 46 to unhook from the expansion unit, which momentarily rests by gravity on the supporting, rounded end 18. Further descent of the muffler 9 then lowers the spherical bell 28 into abutment with the rounded terminus 27 and then compresses the expansion unit spring 37 as the upper tube 26 is telescoped with the lower tube 22. The parts are thus restored to their spring-pressed, abutting, relatively gas-tight, movable interengagement.

What is claimed is:

An exhaust system comprising an elbow of uniformly thick sheet metal having an outwardly and downwardly turned spherically rounded first flange at its open upper end, a downturned bell of uniformly thick sheet metal having an inwardly and upwardly turned second flange at its open lower end, said bell confronting and being movable toward and away from said elbow, a lower cylindrical tube of uniformly thick sheet metal having an enlarged spherical portion at the lower end thereof adapted to abut said first flange, an upper cylindrical tube of uniformly thick sheet metal telescoped over said lower tube and having an outwardly and downwardly turned spherical third flange at its upper end adapted to abut said downturned bell, said third flange having a maximum diameter greater than the minimum diameter of said second flange and said second and third flanges being spaced apart whereby there may be limited axial movement between them, a lower spring cup of uniformly thick sheet metal encompassing said lower tube and resting on the enlarged spherical portion thereof, an upper spring cup of uniformly thick sheet metal encompassing said upper tube, said upper spring cup having openings therein, means for securing said upper spring cup to said upper tube, a plurality of rods secured to said lower spring cup and passing through said openings in said upper spring cup, heads on said rods adapted to abut said upper spring cup to act as stops, and an expansion spring resting at opposite ends in said spring cups and surrounding said upper and lower tubes outside of said rods.

References Cited in the file of this patent
UNITED STATES PATENTS

| | | |
|---|---|---|
| 1,780,693 | Yazel | Nov. 4, 1930 |
| 1,822,624 | Hoeftmann | Sept. 8, 1931 |
| 2,295,907 | Lewis | Sept. 15, 1942 |
| 2,712,456 | McCreary | July 5, 1955 |
| 2,925,874 | Norrie | Feb. 23, 1960 |